United States Patent
Yamamoto

(10) Patent No.: US 10,452,940 B2
(45) Date of Patent: Oct. 22, 2019

(54) MUSICAL SCORE IMAGE ANALYZER AND MUSICAL SCORE IMAGE ANALYZING METHOD

(71) Applicant: YAMAHA CORPORATION, Hamamatsu-shi (JP)

(72) Inventor: Kazuhiko Yamamoto, Hamamatsu (JP)

(73) Assignee: YAMAHA CORPORATION, Hamamatsu-Shi (JP)

( * ) Notice: Subject to any disclaimer, the term of this patent is extended or adjusted under 35 U.S.C. 154(b) by 0 days.

(21) Appl. No.: 15/938,544

(22) Filed: Mar. 28, 2018

(65) Prior Publication Data

US 2018/0225535 A1  Aug. 9, 2018

Related U.S. Application Data

(63) Continuation of application No. PCT/JP2016/079057, filed on Sep. 30, 2016.

(30) Foreign Application Priority Data

Sep. 30, 2015 (JP) .................................. 2015-194931
Sep. 30, 2015 (JP) .................................. 2015-194932

(51) Int. Cl.
*G06K 9/00* (2006.01)
*G06K 9/32* (2006.01)
(Continued)

(52) U.S. Cl.
CPC ........... *G06K 9/32* (2013.01); *G06K 9/00456* (2013.01); *G06K 9/00463* (2013.01);
(Continued)

(58) Field of Classification Search
CPC .. G06K 9/32; G06K 9/00456; G06K 9/00463; G06K 9/6267; G06K 9/6218;
(Continued)

(56) References Cited

U.S. PATENT DOCUMENTS 5,883,970 A * 3/1999 Kikuchi .................. G06K 9/00
                                                    382/113
6,464,585 B1 * 10/2002 Miyamoto ........... G10H 1/0008
                                                    463/30
(Continued)

FOREIGN PATENT DOCUMENTS

| JP | S61062186 A | 3/1986 |
| JP | 2008242714 A | 10/2008 |
| JP | 2013093704 A | 5/2013 |

OTHER PUBLICATIONS

International Search Report issued in Intl. Appln. No. PCT/JP2016/079057 dated Nov. 29, 2016. English translation provided.

(Continued)

*Primary Examiner* — Amir Alavi
(74) *Attorney, Agent, or Firm* — Rossi, Kimms & McDowell LLP

(57) ABSTRACT

A musical score image analyzer includes a processor and a memory having stored thereon instructions executable by the processor to cause the musical score image analyzer to perform: detecting musical symbols in a musical score image obtained by capturing a musical score having a plurality of staffs arranged in parallel to each other and the musical symbols respectively disposed in prescribed positions in the staffs; specifying a symbol column having the detected musical symbols which are arranged in a column; calculating an index relating an image capturing based on the symbol column; and instructing a capturing device to perform capturing operation of a still image for the musical score image when the index satisfies a prescribed condition.

22 Claims, 9 Drawing Sheets

(51) Int. Cl.
  *G10G 1/00* (2006.01)
  *H04N 1/10* (2006.01)
  *H04N 1/107* (2006.01)
  *H04N 5/232* (2006.01)
  *G06K 9/03* (2006.01)

(52) U.S. Cl.
  CPC .......... *G06K 9/036* (2013.01); *G06K 9/3275* (2013.01); *G10G 1/00* (2013.01); *H04N 1/10* (2013.01); *H04N 1/107* (2013.01); *H04N 5/23218* (2018.08)

(58) Field of Classification Search
  CPC . G10G 1/00; G06T 5/006; G06T 2207/10004; G06T 2207/30176
  See application file for complete search history.

(56) References Cited

U.S. PATENT DOCUMENTS

| | | | | |
|---|---|---|---|---|
| 6,740,802 B1* | 5/2004 | Browne, Jr. | ......... | G10H 1/0025 84/609 |
| 7,703,014 B2* | 4/2010 | Funaki | ................. | G10H 1/0008 715/269 |
| 7,847,175 B2* | 12/2010 | Nakano | ................. | G09B 15/023 84/616 |
| 8,586,848 B2* | 11/2013 | Sasaki | ...................... | G10G 1/00 84/600 |
| 2009/0095144 A1* | 4/2009 | Nakano | ................. | G09B 15/023 84/477 R |
| 2012/0247305 A1* | 10/2012 | Katsuta | ................. | G09B 15/023 84/477 R |
| 2012/0250941 A1* | 10/2012 | Katsuta | .................... | G06K 9/00 382/103 |
| 2018/0218479 A1* | 8/2018 | Yamamoto | ............... | G06K 9/00 |
| 2018/0225535 A1* | 8/2018 | Yamamoto | ............... | G06K 9/00 |

OTHER PUBLICATIONS

Written Opinion issued in Intl. Appln. No. PCT/JP2016/079057 dated Nov. 29, 2016.

English translation of Written Opinion issued in Intl. Appln. No. PCT/JP2016/079057 dated Nov. 29, 2016, previously cited in IDS filed Mar. 28, 2018.

* cited by examiner

MUSICAL SCORE IMAGE ANALYZER AND MUSICAL SCORE IMAGE ANALYZING METHOD

CROSS REFERENCE TO RELATED APPLICATIONS

This application is a continuation of PCT application No. PCT/JP2016/079057, which was filed on Sep. 30, 2016 based on Japanese Patent Application (No. 2015-194931) filed on Sep. 30, 2015 and Japanese Patent Application (No. 2015-194932) filed on Sep. 30, 2015, the contents of which are incorporated herein by reference.

BACKGROUND OF THE INVENTION

1. Field of the Invention

The present invention relates to a technique for analyzing an image of a musical score.

2. Description of the Related Art

Techniques for processing images shot by users have been conventionally proposed. For example, JP-A-2013-93704 discloses a technique for correcting curved distortion of an image of a book shot by a user with an imaging device such as a digital camera.

The technique of JP-A-2013-93704 is merely one for correcting curved distortion to be employed on the assumption of the occurrence thereof, and cannot be employed for quantitatively evaluating whether or not a capturing direction for a book is suitable, or for presenting, to the user, a capturing direction for reducing the distortion on the basis of the evaluation result.

Besides, although the curved distortion of a shot image can be corrected by using the technique of JP-A-2013-93704, it is originally significant to shoot an image in a suitable capturing direction for reducing the distortion of the resultant shot image. It is, however, actually not easy for a user to adjust a capturing direction of an imaging device while visually checking the distortion of a book displayed on a monitor of a digital camera or the like, and to issue a capturing instruction while keeping the imaging device in a suitable capturing direction.

SUMMARY OF THE INVENTION

In consideration of these circumstances, an object of the present invention is to quantitatively evaluate whether or not a capturing direction is suitable. Besides, another object of the present invention to obtain an image of a musical score shot in a suitable capturing direction without a user issuing a capturing instruction.

One aspect of the present invention provides a musical score image analyzer that includes a processor and a memory having stored thereon instructions executable by the processor to cause the musical score image analyzer to perform: detecting musical symbols in a musical score image obtained by capturing a musical score having a plurality of staffs arranged in parallel to each other and the musical symbols respectively disposed in prescribed positions in the staffs; specifying a symbol column having the detected musical symbols which are arranged in a column; calculating an index relating an image capturing based on the symbol column; and instructing a capturing device to perform capturing operation of a still image for the musical score image when the index satisfies a prescribed condition.

DETAILED DESCRIPTION OF THE EXEMPLARY EMBODIMENTS

First Embodiment

Figure 1:
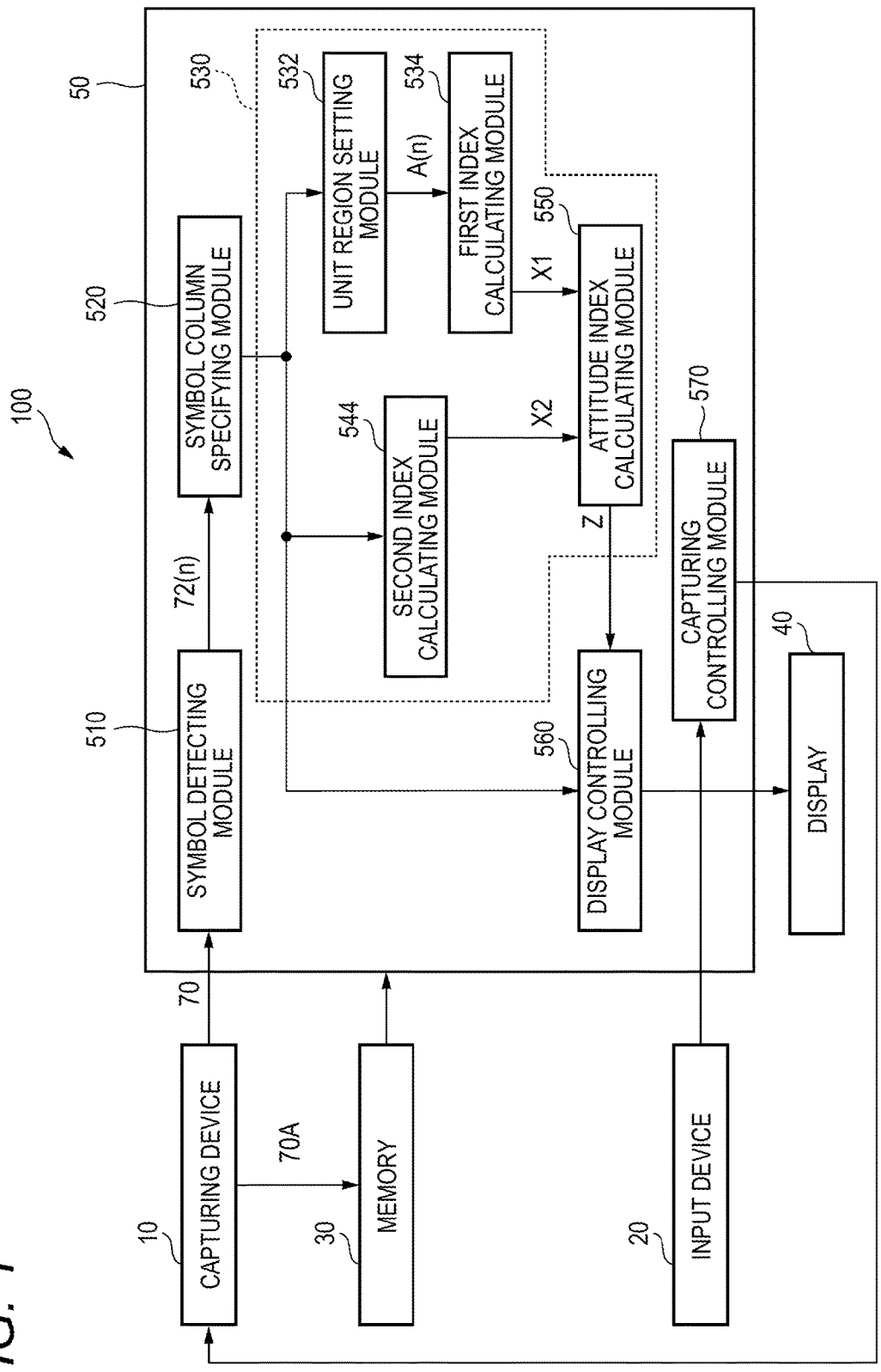
FIG. 1 is a configuration diagram of a musical score image analyzer according to a first embodiment.

FIG. 1 is a configuration diagram of a musical score image analyzer 100 according to a first embodiment. The musical score image analyzer 100 is an apparatus analyzing an image of a musical score shot by a user, and is realized by using, for example, a portable device such as a smartphone or a tablet. As exemplarily illustrated in FIG. 1, the musical score image analyzer 100 of the first embodiment includes a capturing device 10, an input device 20, a memory 30, a display 40 and a control unit 50.

The capturing device 10 is a device for capturing an image, and is configured to include an image sensing device converting light coming from a subject into an electrical signal. A user shoots an image of a musical score printed on a printed matter or the like with the capturing device 10 held in desired position and direction against the musical score. The capturing device generates and outputs an image 70 of a musical score (hereinafter referred to as the "musical score image") within a prescribed range (hereinafter referred to as the "capturing range"). The capturing device 10 of the first embodiment is capable of capturing a video image and a still image. Specifically, the capturing device 10 generates a plurality of musical score images 70 at prescribed time intervals through a video-image capturing operation, and generates one musical score image 70 through a still image capturing operation. As exemplarily illustrated in FIG. 2, a lateral direction of the musical score image 70 (a lateral direction of the capturing range) is designated as the x-axis direction, and a longitudinal direction (a longitudinal direction of the capturing range) is designated as the y-axis direction in the following description. In the first embodiment, an example where the capturing device 10 is integrally included in the musical score image analyzer 100 will be described.

Figure 2:
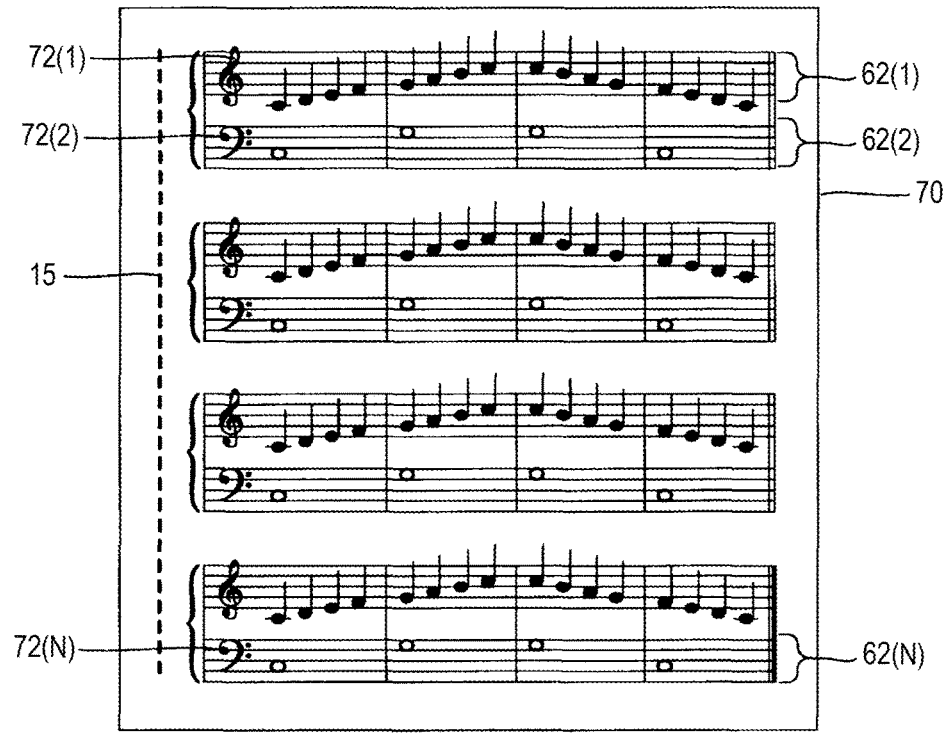
FIG. 2 is a diagram of an example of a musical score image displayed when a capturing direction is in parallel to the normal direction of the musical score.

As exemplarily illustrated in FIG. 2, a plurality of combinations (N combinations) each including one of sets of a plurality of parallel lines (hereinafter referred to as staffs) 62(1) to 62(N) and one musical symbol 72($n$) disposed in a prescribed position of the corresponding staff 62($n$) (wherein n=1 to N) are arranged in the longitudinal direction on a musical score. Each staff 62($n$) of the first embodiment is a five-line staff consisting of five lines respectively corresponding to different pitches. Symbols including notes, rests and accidentals used for expressing a musical piece are disposed in arbitrary positions in the staff 62($n$). In the first embodiment, a treble clef and a bass clef positioned in the vicinity of the left end of the staff 62($n$) of the musical score are shown as examples of the musical symbol 72($n$).

Figure 3:
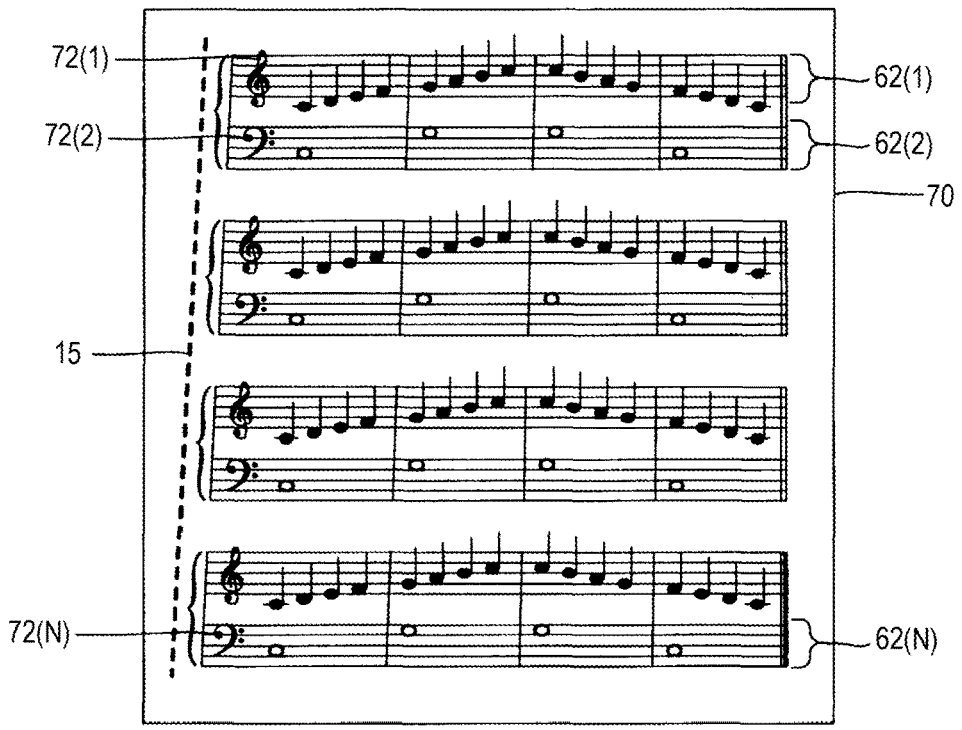
FIG. 3 is a diagram of an example of the musical score image displayed when the capturing direction is inclined against the normal direction of the musical score.

A user shoots an image with the capturing device 10 (the musical score image analyzer 100) held in such a manner that the whole musical score (of one page) is included in the capturing range. Specifically, the user adjusts the capturing direction to attain a state where the capturing direction is parallel to the normal direction of the musical score and the x-axis direction of the musical score image 70 is parallel to the lateral direction of the musical score (hereinafter, which state will be referred to as the "reference state"). In the reference state, the plural musical symbols 72(1) to 72(N) are arranged in parallel to the y-axis direction as illustrated with a broken line 15, and each of the staffs 62($n$) is parallel to the x-axis direction as exemplarily illustrated in FIG. 2. Actually, however, it is not easy for a user to continuously hold the capturing device 10 in the reference state, and hence, the capturing direction can be inclined against the normal direction of the musical score, or the capturing range can be rotated from that of the reference state around the normal direction of the musical score (namely, the x-axis direction of the musical score image 70 cannot be parallel to the lateral direction of the musical score). In such a state where the capturing direction is inclined (hereinafter referred to as the "inclined state") or where the capturing range is rotated (hereinafter referred to as the "rotated state"), the arrangement of the plural musical symbols 72(1) to 72(N) may not be parallel to the y-axis direction in some cases in the musical score image 70 as exemplarily illustrated with a broken line 15 in FIG. 3.

The display 40 of FIG. 1 is, for example, a liquid crystal display panel, and displays an image instructed by the control unit 50. For example, the plural musical score images 70 generated in a video-image capturing operation of the capturing device 10 are successively displayed on the display 40 (as a live view display). The input device 20 is an operation device to be operated by a user for issuing various instructions to the musical score image analyzer 100, and is configured, for example, to include a plurality of operating elements to be operated by a user. Specifically, a user can instruct the musical score image analyzer 100 to perform a still image capturing operation or a video-image capturing operation by appropriately operating the input device 20. A touch panel configured integrally with the display 40 can be used as the input device 20.

The memory 30 is a known recording medium such as a magnetic recording medium or a semiconductor recording medium, and stores programs to be executed by the control unit 50 and various data to be used by the control unit 50. For example, a musical score image 70A of a still image generated by the capturing device 10 through a still image capturing operation is stored in the memory 30.

The control unit 50 is configured by a processor such as a CPU (Central Processing Unit), and executes the programs stored in the memory 30 to function, as exemplarily illustrated in FIG. 1, as a plurality of elements (i.e., a symbol detecting module 510, a symbol column specifying module 520, a unit region setting module 532, a first index calculating module 534, a second index calculating module 544, an attitude index calculating module 550, a display controlling module 560, and a capturing controlling module 570) for analyzing the musical score image shot by the capturing device 10. Incidentally, a configuration in which some functions of the control unit 50 are realized by using dedicated electrical circuits, or a configuration in which the functions of the control unit 50 are distributed to a plurality of devices can be employed.

The respective elements realized by the control unit 50 will now be described in detail. The processing performed by the respective elements described below is executed (as described in detail below) successively for each musical score image 70 actually simultaneously with a video-image capturing operation performed by the capturing device 10, but for convenience sake, the following description will be given with respect to one musical score image 70.

Figure 4:
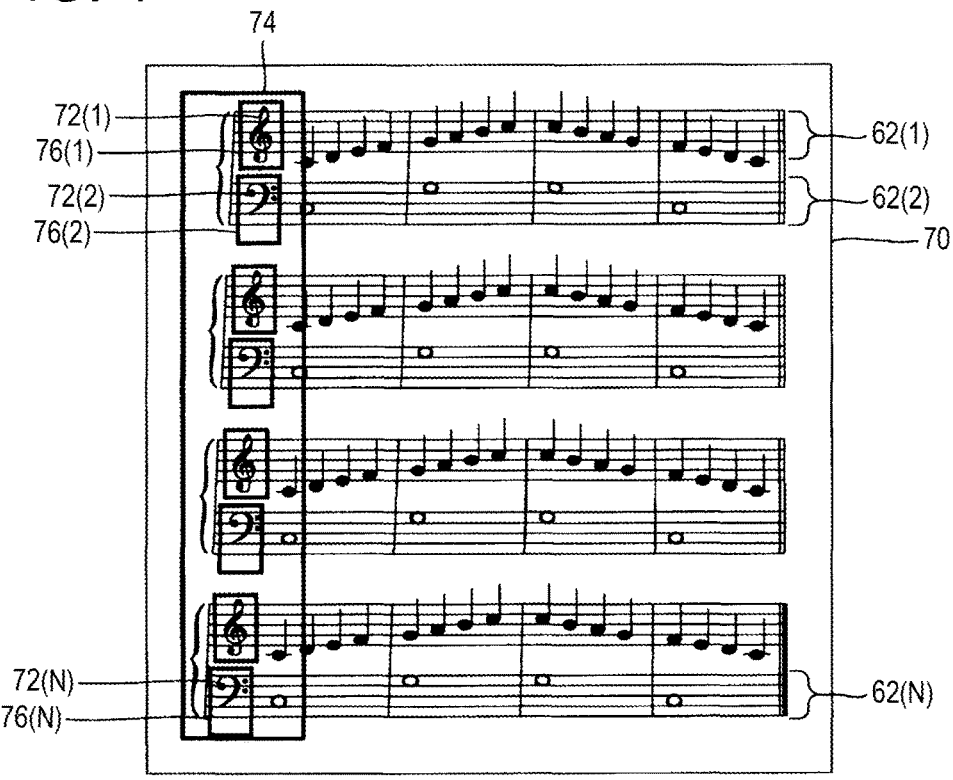
FIG. 4 is an explanatory diagram of processing performed by a symbol detecting module.

The symbol detecting module 510 detects a plurality of (N) musical symbols 72(1) to 72(N) in each musical score image 70 generated in a time-series manner through a video-image capturing operation by the capturing device 10. For the detection of the musical symbol 72($n$) by the symbol detecting module 510, any of known image recognition techniques (such as a pattern recognition technique) can be arbitrarily employed. FIG. 4 is a diagram explaining processing of the first embodiment performed on the musical score image 70 by the symbol detecting module 510. As exemplarily illustrated in FIG. 4, the symbol detecting module 510 sets a symbol region 76($n$) including each musical symbol 72($n$) detected in the musical score image 70. Each symbol region 76($n$) is a rectangular region formed by straight lines parallel to the x-axis and a straight lines parallel to the y-axis.

In consideration that the musical symbols 72(1) to 72(N) are disposed in the vicinity of the left end of each staff 62($n$), and that the user shoots the image to include the whole musical score (of one page) in the capturing range, the N musical symbols 72(1) to 72(N) are very likely disposed within a longitudinal region positioned on the left side of the musical score image 70. Therefore, the symbol detecting module 510 of the first embodiment detects, as exemplarily illustrated in FIG. 4, the musical symbols 72(1) to 72(N) in a prescribed range 74 of the musical score image 70 where the musical symbols 72(1) to 72(N) are presumed to be positioned. In other words, a region outside the range 74 is excluded from a range for searching the musical symbol 72($n$). The range 74 is a rectangular region extending in the y-axis direction and formed in a left end module of the musical score image 70 by straight lines parallel to the x-axis and straight lines parallel to the y-axis. Incidentally, the user may adjust the capturing range of the capturing device 10 (i.e., a distance between the musical score and the capturing device 10) so that the musical symbols 72(1) to 72(N) are included in the range 74. In this manner, the prescribed range 74 of the musical score image 70 is set as the search region for the musical symbol 72(n) and the musical symbol 72(n) is not searched for outside the prescribed range 74 in the first embodiment. Accordingly, as compared with a configuration where the musical symbol 72(n) is searched for in the whole range of the musical score image 70, processing load of the symbol detecting module 510 (and processing load of the entire musical score image analyzer 100 in addition) can be reduced.

Figure 5:
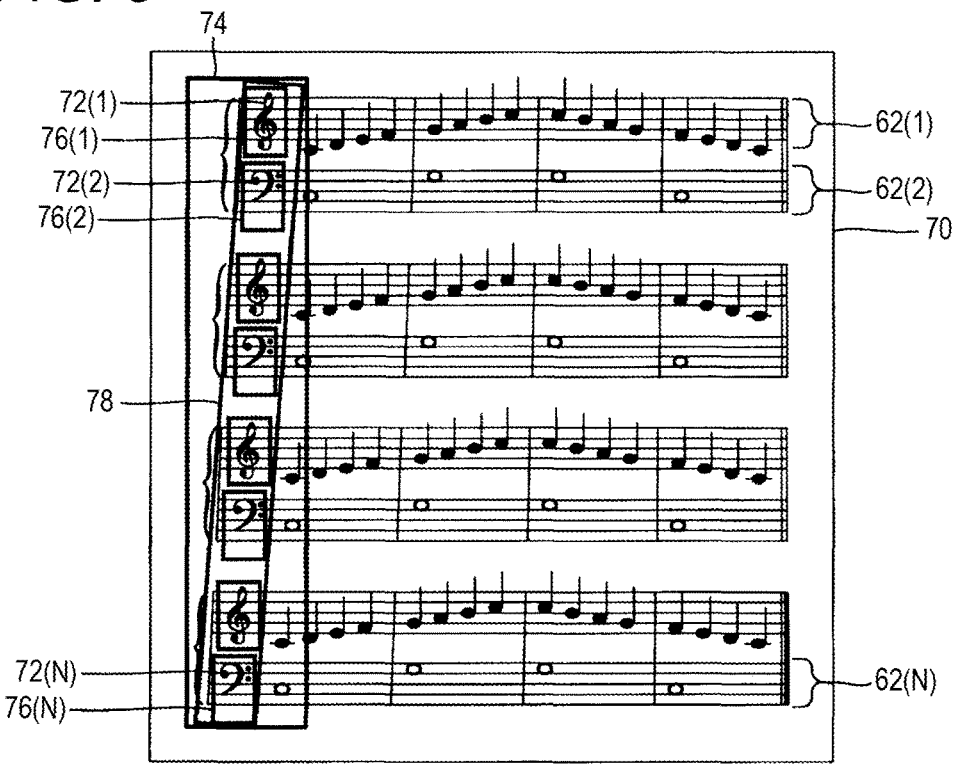
FIG. 5 is an explanatory diagram of processing performed by a symbol column specifying module.

The symbol column specifying module 520 of FIG. 1 specifies a column of the N musical symbols 72(1) to 72(N) having been detected by the symbol detecting module 510 (hereinafter referred to as the "symbol column"). FIG. 5 is a diagram explaining processing of the first embodiment performed on the musical score image 70 by the symbol column specifying module 520. As exemplarily illustrated in FIG. 5, the symbol column specifying module 520 of the first embodiment sets a symbol column pattern 78 corresponding to the symbol column. Specifically, the symbol column specifying module 520 sets a rectangular symbol column pattern 78 that embraces the respective apexes of the N symbol regions 76(1) to 76(N) and has the minimum area. As described above, in the inclined state or in the rotated state, the symbol column is inclined against the x-axis direction and the y-axis direction. Therefore, as understood from FIG. 5, the symbol column pattern 78 specified by the symbol column specifying module 520 can be inclined against the x-axis direction and the y-axis direction in accordance with the degree of the inclination of the capturing direction against the normal direction of the musical score or the rotation of the capturing range against the musical score.

Figure 6:
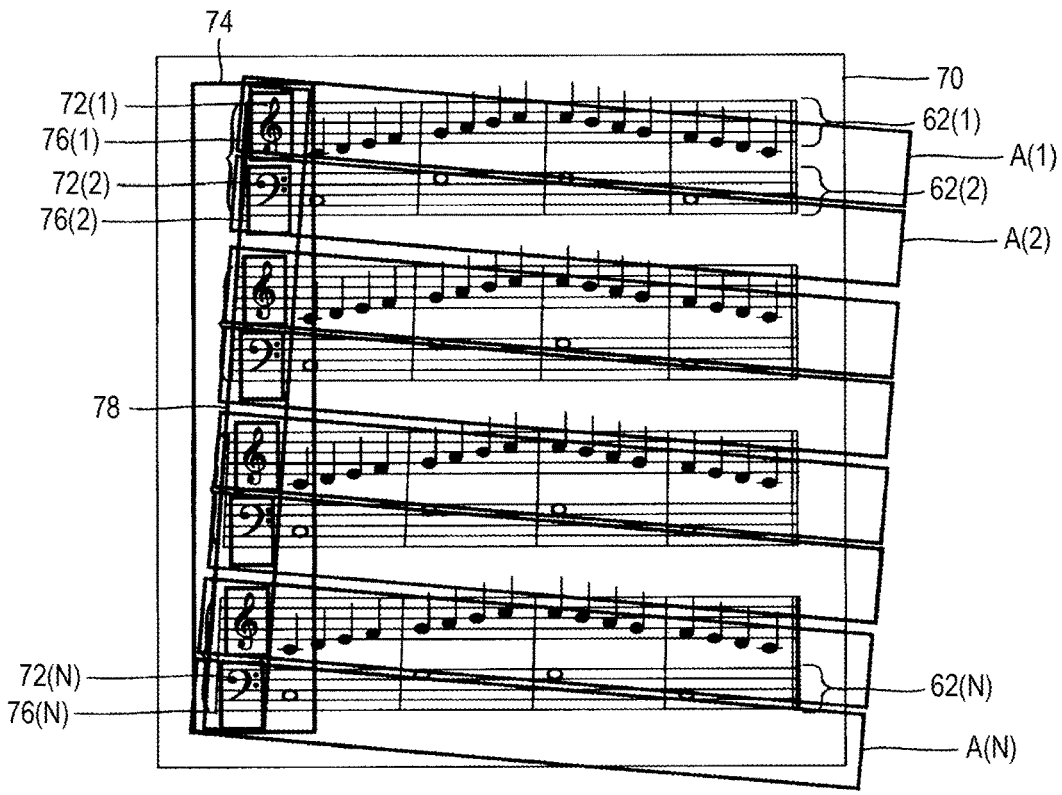
FIG. 6 is an explanatory diagram of processing performed by a unit region setting module.

The unit region setting module 532 of FIG. 1 sets, as exemplarily illustrated in FIG. 6, N unit regions A(1) to A(N) respectively corresponding to the musical symbols 72(n) having been detected by the symbol detecting module 510. The unit region A(n) corresponding to an arbitrary one musical symbol 72(n) is a rectangular region crossing the symbol column pattern 78 having been specified by the symbol column specifying module 520 in a position corresponding to the musical symbol 72(n). Specifically, the unit region A(n) is a rectangular region extending from the musical symbol 72(n) in a direction perpendicular to the long sides of the symbol column pattern 78. The width of the unit region A(n) (i.e., the size thereof in the direction perpendicular to the symbol column pattern 78) is set to a prescribed proportion (of, for example, 95%) to the width of the musical score image 70, and the length of the unit region A(n) (i.e., the size in a direction parallel to the symbol column pattern 78) is set to a prescribed proportion (of, for example, 120 to 130%) to the length of the symbol region 76(n). As understood from FIG. 6, if the symbol column pattern 78 is inclined, each unit region A(n) is also similarly inclined against the x-axis direction and the y-axis direction.

The first index calculating module 534 of FIG. 1 calculates a first index X1. The first index X1 is an index corresponding to the degree of the inclination of the capturing direction against the normal direction of the musical score. Specifically, the first index calculating module 534 calculates, with respect to each unit region A(n) having been set by the unit region setting module 532, a ratio R(n) at which the staff 62(n), where the musical symbol 72(n) corresponding to the unit region A(n) is disposed, is included in the unit region A(n), and calculates the first index X1 in accordance with ratios R(1) to R(N) in the N unit regions A(1) to A(N).

Figure 7:
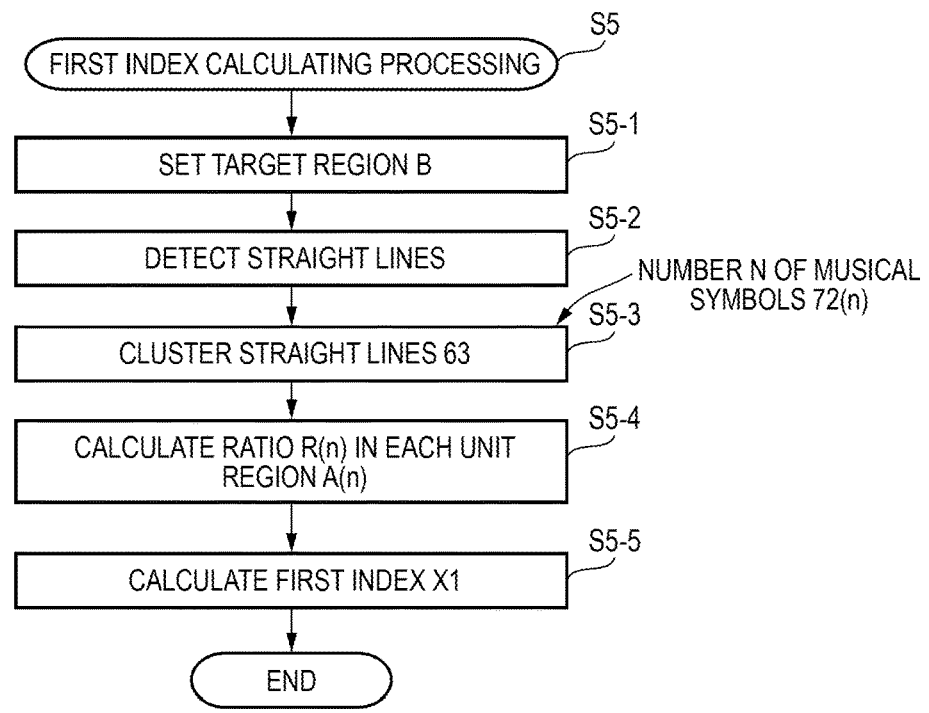
FIG. 7 is a flowchart of processing for calculating a first index by a first index calculating module.
Figure 8:
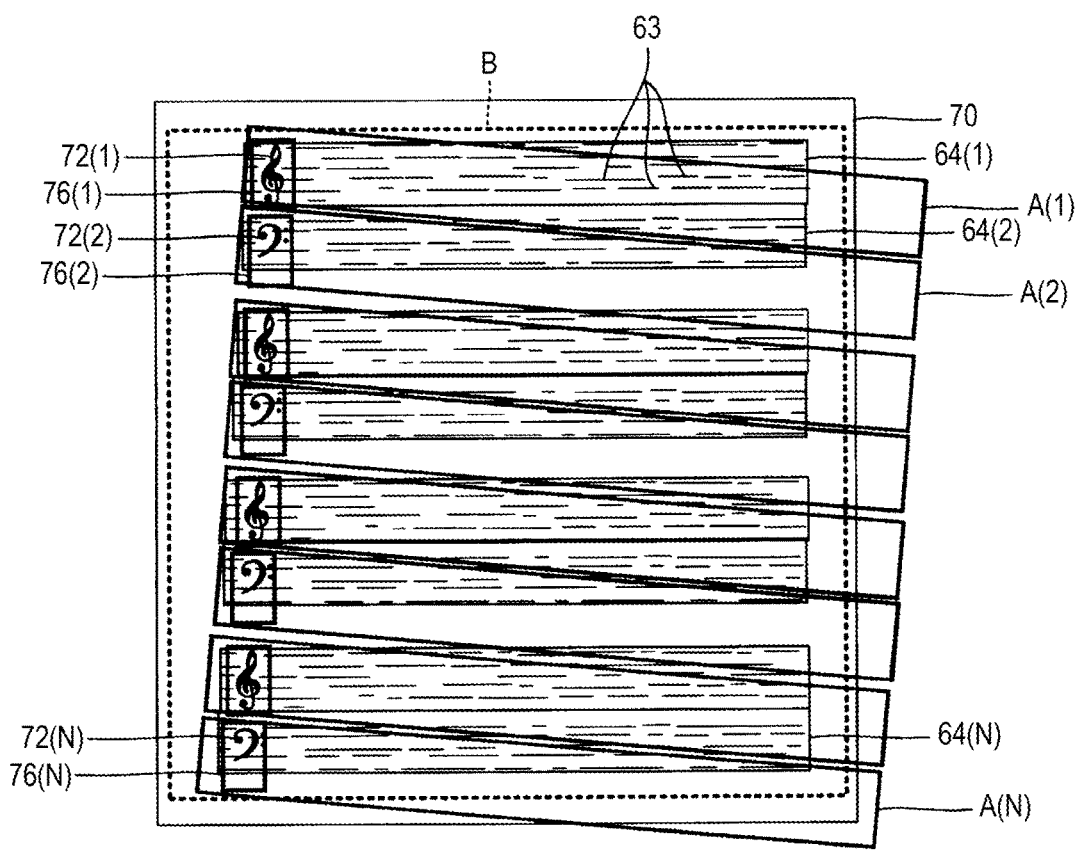
FIG. 8 is an explanatory diagram of the processing performed by the first index calculating module.

FIG. 7 is a flowchart of processing S5 for calculating the first index X1 by the first index calculating module 534 of the first embodiment (hereinafter referred to as the "first index calculating processing"), and FIG. 8 is a diagram explaining the first index calculating processing S5. When the unit region setting module 532 sets the unit region A(n), the first index calculating processing S5 is started.

When the first index calculating processing S5 is started, the first index calculating module 534 sets a target region B in the musical score image 70 (S5-1). The target region B is, as exemplarily illustrated in FIG. 8, a rectangular region formed by straight lines parallel to the x-axis and straight lines parallel to the y-axis. Specifically, the width of the target region B is set to a specific proportion (of, for example, 95%) to the width of the musical score image 70, and the length of the target region B is set to a size including all the apexes of the symbol column pattern 78.

The first index calculating module 534 detects straight lines 63 within the target region B having been set in step S5-1 of FIG. 7 in the musical score image 70 (which detection will be hereinafter designated as the "straight line detection") (S5-2). Specifically, as exemplarily illustrated in FIG. 8, the straight line detection is performed in the target region B in the musical score image 70, so as to detect a plurality of straight lines 63 in patterns including the staffs 62(1) to 62(N) in the musical score image 70. For the straight line detection, any of known feature detection (such as Hough transform) processing can be arbitrarily employed. Incidentally, since there is a high possibility that an outside region of the target region B does not correspond to the musical score, the outside region is excluded from the target of the straight chain detection performed by the first index calculating module 534.

The first index calculating module 534 classifies the plural straight lines 63 having been detected in step S5-2 of FIG. 7 into a plurality of sets 64(n) with respect to each staff 62(n) (each musical symbol 72(n)) (S5-3). For classifying the straight lines 63, any of known clustering techniques (such as k-means method) can be employed. Specifically, the first index calculating module 534 classifies the plural straight lines 63 having been detected in the musical score image 70 into sets 64(n) in the same number as that of the musical symbols 72(n) having been detected by the symbol detecting module 510. For example, clustering with the number N of the musical symbols 72(n) specified as the number of classes can be employed to classify the plural straight lines 63 into N sets 64(n). Besides, as described above, each staff 62(n) is a set of a plurality of parallel straight lines, and hence, a plurality of straight lines 63 detected in an arbitrary one staff 62(n) are distributed in mutually close positions. Therefore, as exemplarily illustrated in FIG. 8, a plurality of straight lines 63 having been detected in the staff 62(n) where the musical symbol 72(n) is disposed can be classified into the same set 64(n). Accordingly, even if one unit region A(n) is inclined against the x-axis direction to extend over the plural staffs 62(n), the ratio R(n) at which the staff 62(n) is included in the unit region A(n) can be highly precisely specified with respect to each staff 62(n). Besides, since the plural straight lines 63 detected in the plural staffs 62(n) are classified into the sets 64(n) in the same number as that of the musical symbols 72(n), as compared with a configuration where the number of classes for classifying the plural straight lines 63 is unknown, the plural straight lines 63 can be advantageously appropriately classified.

The first index calculating module 534 calculates, with respect to each of the N unit regions A(1) to A(N), the ratio R(n) at which the straight lines 63 having been classified into each set 64(n) in step S5-3 of FIG. 7 are included in the unit region A(n) (S5-4). Specifically, out of points (such as endpoints and midpoints) on each of the plural straight lines 63 classified into each set 64(n), a ratio R(n) of the number of points included in the unit region A(n) is calculated. If the number of points on each straight line 63 is thus calculated, the ratio R(n) can be advantageously easily calculated as compared with a configuration where a ratio in the length of each straight line 63 positioned within the unit region A(n) is calculated.

In the reference state where the capturing direction is parallel to the normal direction of the musical score, each staff 62(n) extends in the x-axis direction and the symbol column pattern 78 is substantially parallel to the y-axis direction, and therefore, each unit region A(n) extends in a direction substantially parallel to the x-axis direction (namely, a direction substantially parallel to the staff 62(n)). Therefore, most of the straight lines 63 classified into the set 64(n) are embraced in the unit region A(n), and hence the ratio R(n) has a large value. On the other hand, in the inclined state where the capturing direction is inclined against the normal direction of the musical score, as exemplarily illustrated in, for example, FIG. 6, each staff 62(n) extends in the x-axis direction and the symbol column pattern 78 is inclined against the x-axis and y-axis directions, and hence each unit region A(n) also extends in a direction inclined against the x-axis and y-axis directions. Therefore, as exemplarily illustrated in FIG. 8, many of the straight lines 63 classified into the set 64(n) are not embraced in the unit region A(n), and hence the ratio R(n) has a small value. In other words, the ratio R(n) can be used as an index corresponding to the degree of the inclination of the capturing direction against the normal direction of the musical score.

The first index calculating module 534 calculates the first index X1 in accordance with the ratios R(n) in the N unit regions A(1) to A(N) having been calculated in step S5-4 of FIG. 7 (S5-5). Specifically, a sum or a weighted sum of the N ratios R(1) to R(N) is calculated as the first index X1. In this manner, the first index X1 is calculated in accordance with the ratios R(n) in the N unit regions A(1) to A(N) in the first embodiment, and therefore, the degree of the inclination of the capturing direction against the normal direction of the musical score can be comprehensively evaluated over a wide range of the musical score image 70. What has been described so far is a specific example of the first index calculating processing S5.

Figure 9:
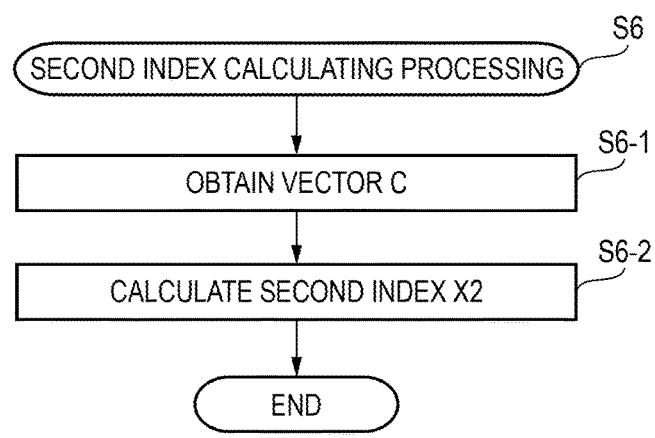
FIG. 9 is a flowchart of processing for calculating a second index by a second index calculating module.

The second index calculating module 544 of FIG. 1 calculates a second index X2. The second index X2 is an index corresponding to the degree of the inclination of the capturing direction against the normal direction of the musical score or the rotation of the capturing range against the musical score. Specifically, the second index calculating module 544 calculates the second index X2 in accordance with an angle of the symbol column (the column of the N musical symbols 72(1) to 72(N)) having been specified by the symbol column specifying module 520. FIG. 9 is a flowchart of processing S6 for calculating the second index X2 by the second index calculating module 544 of the first embodiment (hereinafter referred to as the "second index calculating processing"). For example, when the symbol column specifying module 520 specifies the symbol column, the second index calculating processing S6 is started.

Figure 10:
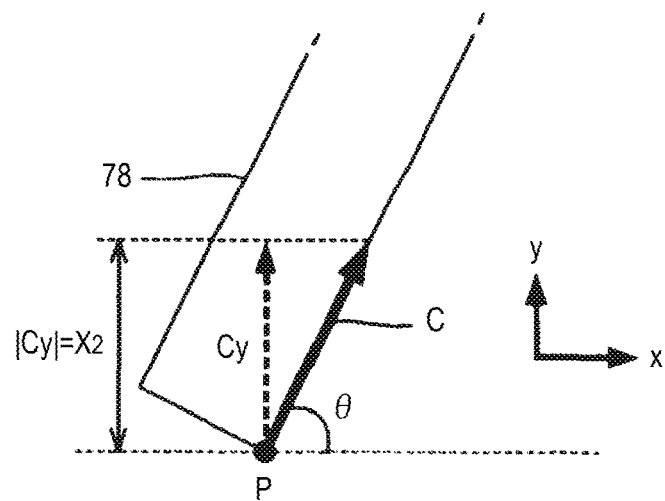
FIG. 10 is an enlarged view of a symbol column pattern for explaining a vector.

When the second index calculating processing S6 is started, the second index calculating module 544 obtains a vector C in parallel to the symbol column having been specified by the symbol column specifying module 520 (S6-1). Specifically, the symbol column specifying module 520 obtains a vector C in parallel to the straight lines forming the symbol column pattern 78. FIG. 10 is an enlarged view of the symbol column pattern 78 for explaining the vector C. For example, a vector C that has an initial point P on the apex of the symbol column pattern 78 closest to the x-axis among the apexes thereof and is parallel to the long sides of the symbol column pattern 78 and inclined against the x-axis by an angle θ is obtained. The vector C is a unit vector normalized to have a length (in absolute value) of 1. The angle θ of the vector C can be also said as the angle of the symbol column against the x-axis.

The second index calculating module 544 calculates, as the second index X2, the absolute value |Cy| (0≤|Cy|≤1) of a y-axis component Cy of the vector C (S6-2). In the reference state, the symbol column pattern 78 is substantially parallel to the y-axis direction, and hence the vector C is also substantially parallel to the y-axis. Accordingly, the absolute value |Cy| of the component Cy of the vector C, namely, the second index X2, has a value close to the maximum value of 1. On the other hand, in the inclined state or the rotated state, the symbol column pattern 78 is inclined against the x-axis and they-axis directions. Therefore, the second index X2 is smaller than 1. As understood from the description made so far, the second index X2 can be used as an index of the degree of the inclination of the capturing direction against the normal direction of the musical score in the inclined state, and the degree of the rotation of the capturing range from that of the reference state in the rotated state.

The attitude index calculating module 550 of FIG. 1 calculates an attitude index Z. The attitude index Z is an index indicating whether or not the attitude of the user holding the capturing device 10 (namely, the capturing direction of the capturing device 10) is close to that of the reference state. Specifically, the attitude index calculating module 550 calculates the attitude index Z in accordance with the first index X1 having been calculated by the first index calculating module 534 and the second index X2 having been calculated by the second index calculating module 544. For example, a product of the first index X1 and the second index X2 is calculated as the attitude index Z. As described above, both the first index X1 and the second index X2 have larger values when the capturing direction is closer to that of the reference state (namely, when the x-axis direction of the capturing range is closer to parallel to the lateral direction of the musical score), and therefore, the attitude index Z obtained as the product of the first index X1 and the second index X2 has a larger value as the capturing direction is closer to that of the reference state. In other words, the attitude index Z can be used as an index indicating whether or not the capturing direction of the capturing device 10 is closer to that of the reference state.

As understood from the description made so far, the unit region setting module 532, the first index calculating module 534, the second index calculating module 544 and the attitude index calculating module 550 of FIG. 1 together function as an index calculating module 530 for calculating the attitude index Z corresponding to the index indicating whether or not the capturing direction for the musical score is suitable.

Figure 11:
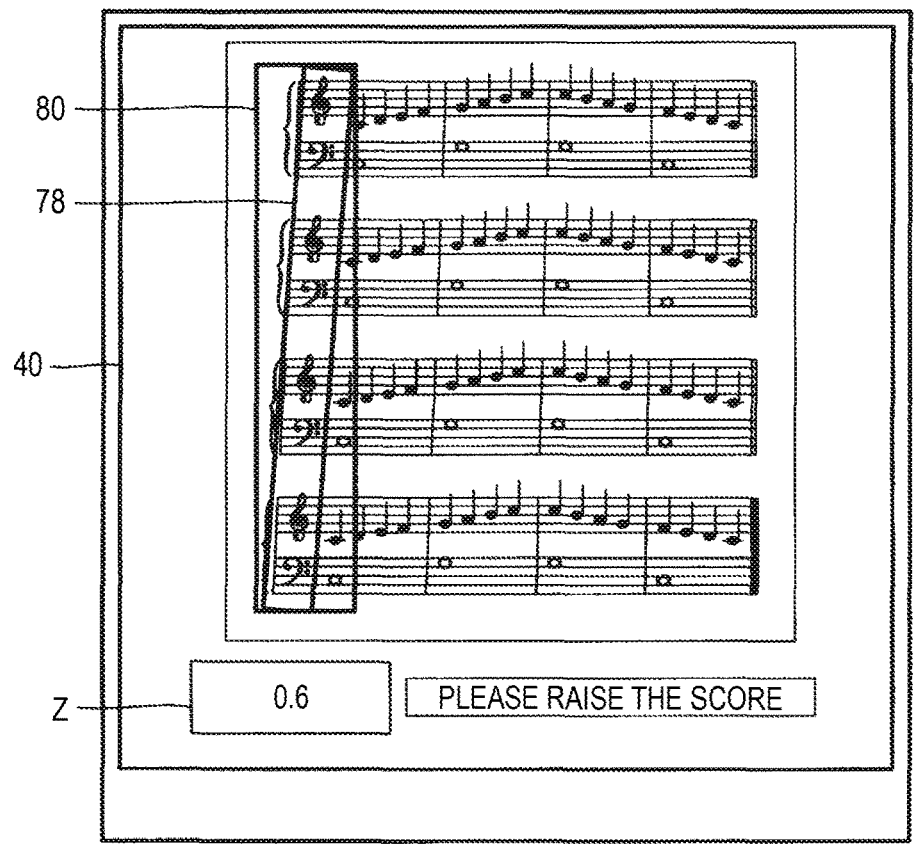
FIG. 11 is a diagram of an example of a musical score image displayed on a display.

The display controlling module 560 of FIG. 1 causes the display 40 to display an analysis result of the musical score image 70. Specifically, the display controlling module 560 of the first embodiment causes the display 40 to display, as exemplarily illustrated in FIG. 11, the symbol column pattern 78 having been set by the symbol column specifying module 520, a reference pattern 80 to be used as a reference of the symbol column pattern 78, and the attitude index Z having been calculated by the attitude index calculating module 550. In the first embodiment, the reference pattern 80 corresponds to the outline of the range 74 where the musical symbols 72(n) are searched for. Specifically, the display controlling module 560 causes the display 40 to display, as exemplarily illustrated in FIG. 11, the symbol column pattern 78 and the reference pattern 80 to be superimposed on the musical score image 70. Besides, the display 40 is caused to display the attitude index Z. The symbol column pattern 78, the reference patter 80 and the attitude index Z are displayed in the display 40 simultaneously with the video-image capturing operation performed by the capturing device 10. It is noted that items caused to be displayed in the display 40 by the display controlling module 560 are arbitrary, and hence, for example, as exemplarily illustrated in FIG. 11, a character string of "Please raise the score." or the like can be displayed as a standard based on which the user adjusts the value (score) of the attitude index Z.

The capturing controlling module 570 of FIG. 1 controls a capturing operation of the capturing device 10. Specifically, the capturing controlling module 570 of the first embodiment instructs the capturing device 10 to perform a video-image capturing operation when the user has issued a video-image capturing instruction to the input device 20, and instructs the capturing device 10 to perform a still image capturing operation when the user has issued a still image capturing instruction to the input device 20. The user can issue a still image capturing instruction to the input device 20 at arbitrary timing during the video-image capturing operation. A musical score image 70A of a still image generated through the still image capturing operation is caused by the capturing controlling module 570 to be stored in the memory 30.

Figure 12:
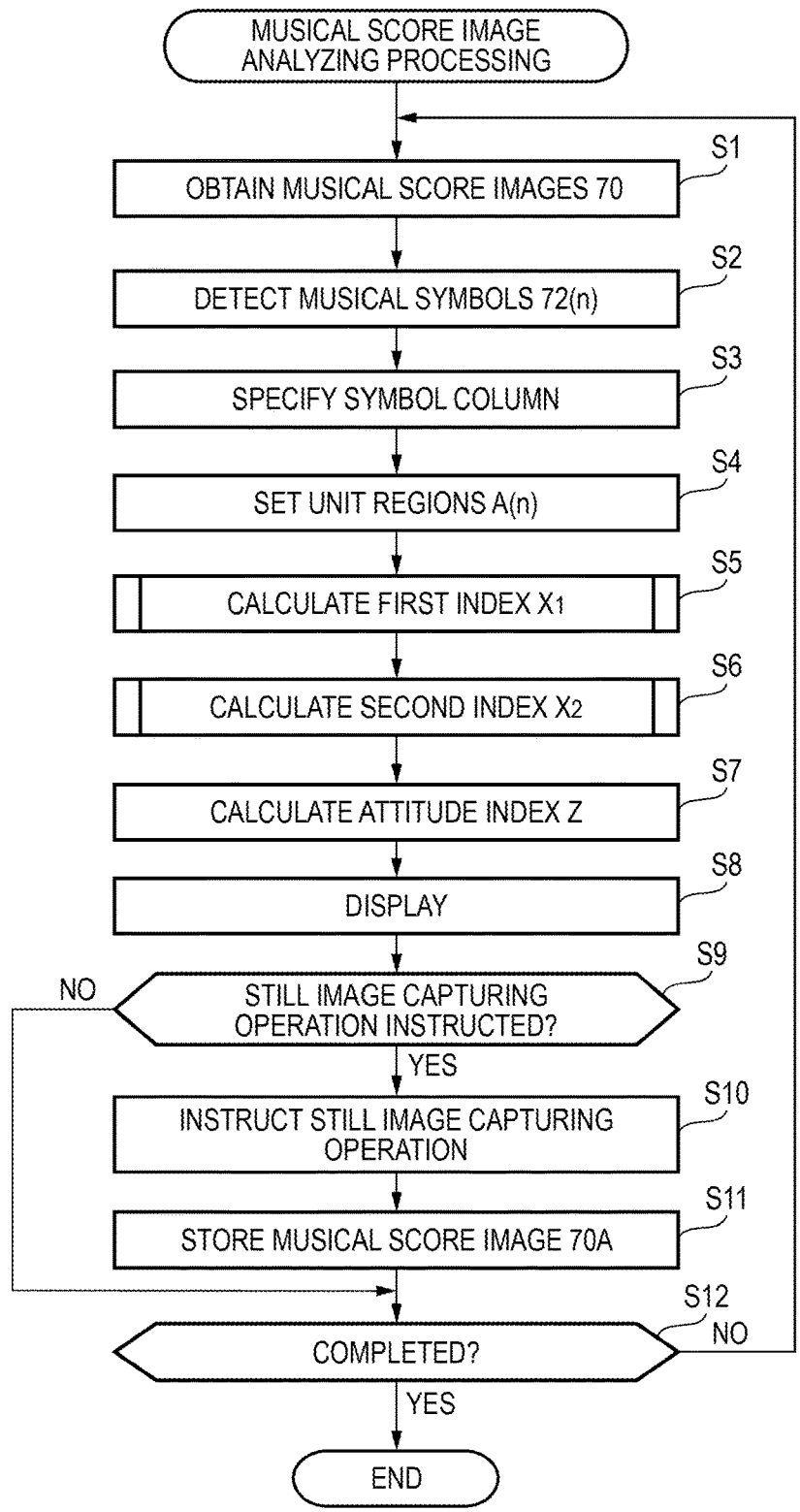
FIG. 12 is a flowchart of processing for analyzing a musical score image by a control unit of the first embodiment.

FIG. 12 is a flowchart of processing for analyzing the musical score image 70 by the control unit 50 of the first embodiment (hereinafter referred to as the "musical score image analyzing processing). When the user instructs a video-image capturing operation, the musical score image analyzing processing is started. When the musical score image analyzing processing is started, the control unit 50 successively obtains the plural musical score images 70 generated by the capturing device 10 through the video-image capturing operation (S1).

The symbol detecting module 510 detects the musical symbols 72(n) in each musical score image 70 generated by the capturing device 10 (S2). The symbol column specifying module 520 specifies the symbol column (the symbol column pattern 78) corresponding to a column of the plural musical symbols 72(1) to 72(N) having been detected by the symbol detecting module 510 (S3). The unit region setting module 532 sets the unit regions A(n) each crossing the symbol column having been specified by the symbol column specifying module 520 in the position of the musical symbol 72(n) (S4). The first index calculating module 534 calculates the ratio R(n) at which the staff 62(n), where the musical symbol 72(n) is disposed, is included in the corresponding unit region A(n), and calculates the first index X1 in accordance with the ratios R(1) to R(N) in the N unit regions A(1) to A(N) (S5). The specific example of the first index calculating processing S5 has been described above with reference to FIG. 7. The second index calculating module 544 calculates the second index X2 in accordance with the angle θ of the symbol column having been specified by the symbol column specifying module 520 as described above with reference to FIG. 9 (S6).

The attitude index calculating module 550 calculates the attitude index Z in accordance with the first index X1 having been calculated by the first index calculating module 534 and the second index X2 having been calculated by the second index calculating module 544 (S7). Simultaneously with the video-image capturing operation for the musical score, the display controlling module 560 causes the display 40 to display the symbol column pattern 78 having been set by the symbol column specifying module 520, the reference pattern 80 to be used as the reference of the symbol column pattern 78, and the attitude index Z having been calculated by the attitude index calculating module 550 to be superimposed on the musical score image 70 (S8).

The user appropriately adjusts the direction of the capturing device 10 while checking the symbol column pattern 78 and the attitude index Z displayed in the display 40, and when the symbol column pattern 78 is aligned with the reference pattern 80, or when the attitude index Z has a large value, the user operates the input device 20 to instruct a still image capturing operation. The capturing controlling module 570 determines whether or not the instruction of the still image capturing operation has been issued by the user to the input device 20 (S9). If the still image capturing operation has been instructed by the user (YES in S9), the capturing controlling module 570 instructs the capturing device 10 to perform a still image capturing operation (S10), and stores, in the memory 30, the musical score image 70A of a still image shot by the capturing device 10 in response to the instruction (S11). On the other hand, if the still image capturing operation has not been instructed by the user (NO in S9), the processing of step S12 is executed without executing the processing of step S10 and step S11 as exemplarily illustrated in FIG. 12.

If the video-image capturing operation for the musical score is to be completed (YES in S12), for example, if the user has issued an instruction to complete the video-image capturing operation for the musical score to the input device 20, the musical score image analyzing processing of FIG. 12 is completed. On the other hand, if the operation is not completed (NO in S12), the processing of step S1 to step S12 is executed on another musical score image 70 obtained from the capturing device 10. It is noted that the processing of step S6 may be performed before the processing of step S4. In other words, the order of executing the processing for calculating the first index X1 (steps S4 and S5) and the processing for calculating the second index X2 (step S6) is arbitrary.

As understood from the description made so far, the processing of step S1 to step S11 is repeatedly executed until the instruction to complete the video-image capturing operation is issued (YES in S12). In other words, the detection of the musical symbols 72(n) by the symbol detecting module 510 (S2), the specification of the symbol column by the symbol column specifying module 520 (S3), and the calculation of the attitude index Z by the index calculating module 530 (S4 to S7) are successively executed simultaneously with the video-image capturing operation performed by the capturing device 10.

Besides, the operation of the display controlling module 560 to cause the display 40 to display the symbol column pattern 78, the reference pattern 80 and the attitude index Z is also successively executed simultaneously with the video-image capturing operation. Since the user appropriately adjusts the capturing direction of the capturing device 10 so as to align the symbol column pattern 78 with the reference pattern 80, the musical score image 70 also changes every second (in, for example, the position or the size of each musical symbol 72(n)). Accordingly, the symbol column pattern 78 and the attitude index Z change over time. In other words, the display controlling module 560 changes the symbol column pattern 78 and the attitude index Z in accordance with the result of the specification of the symbol column by the symbol column specifying module 520 over time (every time the processing of S1 to S7 is executed). Therefore, the user can adjust the capturing direction to a suitable direction while visually checking the relationship among the symbol column pattern 78, the reference pattern 80 and the musical score image 70.

As described so far, in the first embodiment, the unit regions A(n) crossing the symbol column that is a column of the plural musical symbols 72(n) detected in the musical score image 70 are set, and the first index X1 is calculated in accordance with the ratio at which each staff 62(n) is included in the corresponding unit region A(n). As the capturing direction is more inclined against the normal direction of the musical score, the ratio of the staff 62(n) in the unit region A(n) is reduced, and hence the first index X1 is also reduced. Besides, the second index X2 in accordance with the angle θ of the symbol column is calculated. Since the angle θ of the symbol column changes in accordance with the inclination angle of the capturing direction against the normal direction of the musical score or the rotation angle of the capturing range against the musical score (the rotation angle of the capturing device 10 in a plane parallel to the musical score), the second index X2 also changes in accordance with the angle θ. Accordingly, it can be quantitatively evaluated whether or not the capturing direction for the musical score is suitable.

Incidentally, in the rotated state in which the capturing range is rotated from that of the reference state with the capturing direction kept in parallel to the normal direction of the musical score, the symbol column is inclined against the x-axis direction or the y-axis direction while the respective staffs 62(n) are perpendicular to the symbol column. Accordingly, the second index X2 has a small value, and the first index X1 has a large value. On the other hand, in the inclined state where the capturing direction is inclined against the normal direction of the musical score, both the first index X1 and the second index X2 have a small value. As understood from the description made so far, the second index X2 is affected by the inclination of the symbol column both in the inclined state and the rotated state, but the first index X1 is affected by the inclination of the capturing direction in the inclined state but is not affected by the inclination of the symbol column derived from the rotation of the capturing range. In consideration of these tendencies, the first index X1 is particularly suitably used as the index corresponding to the degree of the inclination (the inclined state) of the capturing direction against the normal direction of the musical score.

Second Embodiment

A second embodiment of the present invention will now be described. In aspects exemplified below, like reference numerals are used to refer to elements having similar actions and functions to those of the elements used in the first embodiment, and the detailed description thereof is appropriately omitted.

Figure 13:
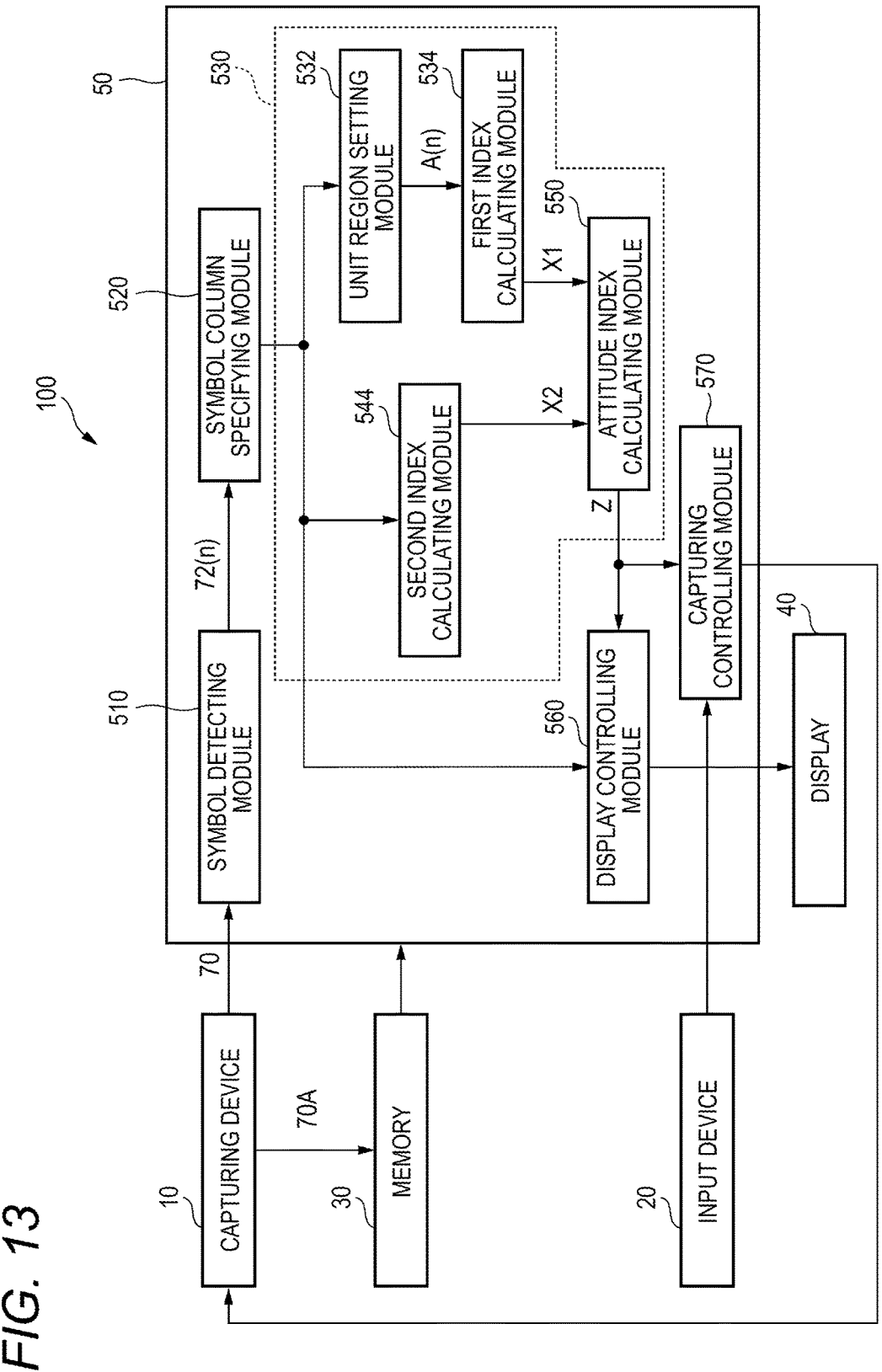
FIG. 13 is a configuration diagram of a musical score image analyzer according to a second embodiment.

FIG. 13 is a configuration diagram of a musical score image analyzer 100 according to the second embodiment. In the first embodiment, when the user operates the input device 20, the capturing controlling module 570 instructs the capturing device 10 to perform a still image capturing operation (S10). As exemplarily illustrated in FIG. 13, the capturing controlling module 570 of the second embodiment instructs the capturing device 10 to perform a still image capturing operation for a musical score image 70A if the attitude index Z having been calculated by the index calculating module 530 satisfies a prescribed condition.

Specifically, the capturing controlling module 570 instructs the capturing device 10 to perform a still image capturing operation in accordance with a result of comparison between the attitude index Z having been calculated by the index calculating module 530 and a prescribed threshold value ZT. For example, if the attitude index Z is larger than the threshold value ZT, the capturing device 10 is instructed to perform a still image capturing operation. The threshold value ZT to be compared with the attitude index Z is experimentally or statistically selected. Alternatively, the threshold value ZT can be set to be variable in accordance with an instruction issued by the user to the input device 20.

Figure 14:
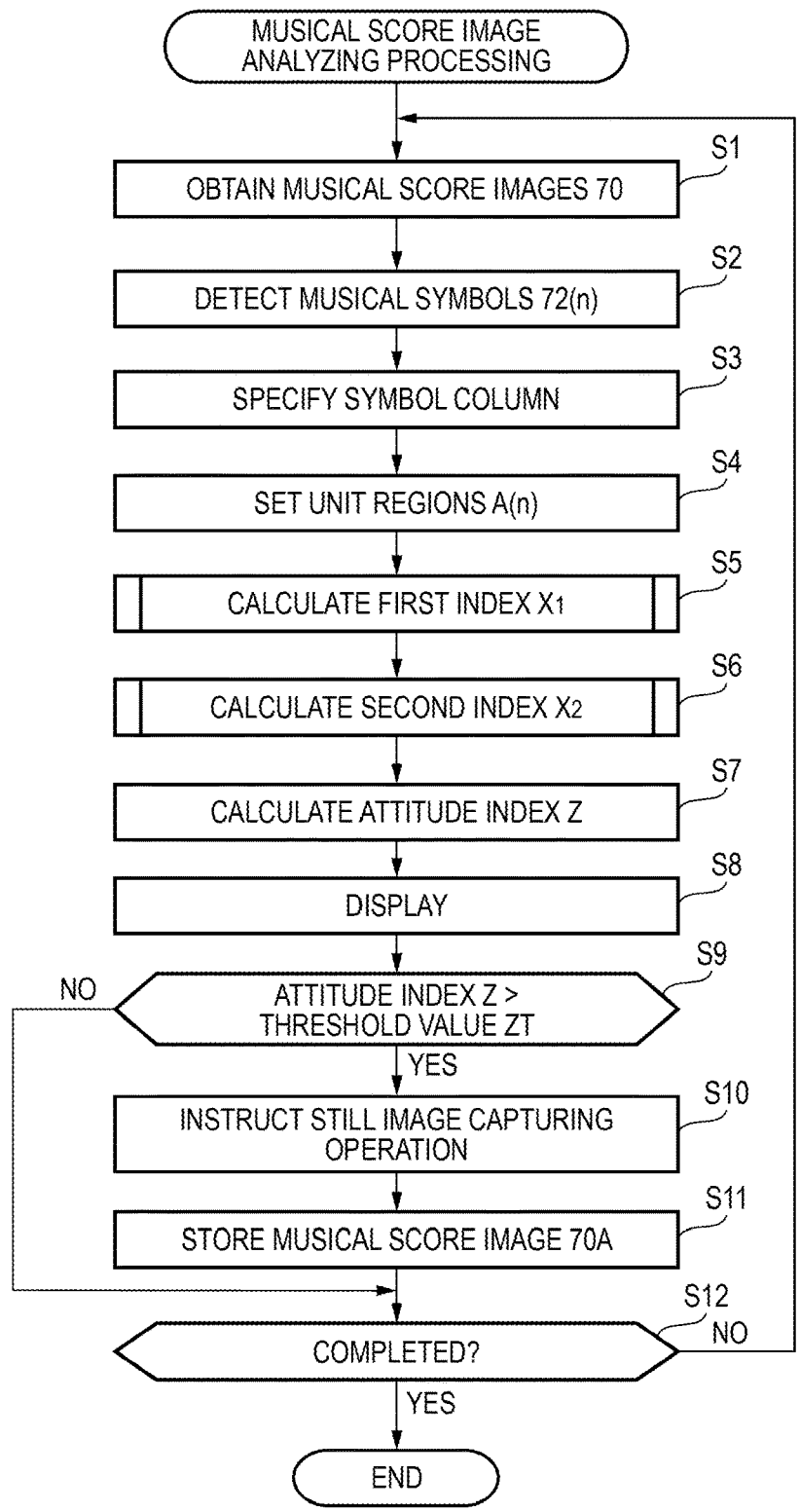
FIG. 14 is a flowchart of processing for analyzing a musical score image by a control unit of the second embodiment.

FIG. 14 is a flowchart of processing for analyzing the musical score image 70 by the control unit 50 of the second embodiment. Processing performed after obtaining the musical score image 70 (S1) until displaying the analysis result (S8) is performed in the same manner as in the first embodiment. The capturing controlling module 570 determines whether or not the attitude index Z having been calculated by the index calculating module 530 is larger than the threshold value ZT (S9). As the capturing direction of the capturing device 10 is closer to that of the reference state, the attitude index Z has a larger value. If the attitude index Z is larger than the threshold value ZT (YES in S9), namely, if the capturing direction of the capturing device 10 is suitable, the capturing controlling module 570 instructs the capturing device 10 to perform a still image capturing operation (S10), and stores, in the memory 30, a musical score image 70A of a still image shot by the capturing device 10 in response to this instruction (S11). On the other hand, if the attitude index Z is smaller than the threshold value ZT (NO in S9), processing of step S12 is executed without executing processing of step S10 and step S11 as exemplarily illustrated in FIG. 14. The processing of step S1 to step S11 is repeatedly executed until the instruction to complete the video-image capturing operation is issued by the user in the same manner as in the first embodiment.

Also in the second embodiment, effects similar to those of the first embodiment can be realized. Besides, in the second embodiment, if the attitude index Z satisfies the prescribed condition, the capturing device 10 is instructed to perform a still image capturing operation for the musical score image 70A. Therefore, a still image of a musical score (a musical score image 70A) shot in a capturing direction suitable for the musical score can be obtained without a user instructing to shoot the image.

<Modifications>

The aspects exemplarily described above can be variously modified. Examples of specific modified aspects are as follows. Two or more aspects arbitrarily selected from the following can be appropriately combined as long as the combination causes no contradictions.

(1) Although the sum or weighted sum of the ratios R(1) to R(N) in the N unit regions A(1) to A(N) is calculated as the first index X1 in each of the above-described aspects, the method for calculating the first index X1 is not limited to that exemplarily described above. For example, in consideration that the angles of the N unit regions A(1) to A(N) inclined against the x-axis direction are substantially the same, it is presumed that the N ratios R(1) to R(N) have mutually close values. Accordingly, the ratio R(n) in a specific one unit region A(n) out of the N unit regions A(1) to A(N) can be used as the first index X1.

(2) Although the absolute value |Cy| of the y-axis component Cy of the vector C that is parallel to the long sides of the symbol column pattern 78 and is inclined against the x-axis by the angle θ is calculated as the second index X2 in each of the above-described aspects, the method for calculating the second index X2 is not limited to that exemplarily described above. For example, an absolute value of an x-axis (or y-axis) component of a vector C parallel to the symbol column can be calculated as the second index X2, or the second index X2 can be calculated by a prescribed operation on the angle θ of the symbol column against the x-axis direction (in which case, there is no need to specify a vector C). As understood from the description made so far, the second index X2 is comprehensively expressed as an index in accordance with the angle θ of the symbol column, and a specific calculation method therefor can be disregarded.

(3) Although the product of the first index X1 and the second index X2 is calculated as the attitude index Z in each of the above-described aspects, the method for calculating the attitude index Z is not limited to that exemplarily described above. For example, a sum or a weighted sum of the first index X1 and the second index X2 can be used as the attitude index Z. Alternatively, the first index X1 may be set as the attitude index Z (with the calculation of the second index X2 omitted), or the second index X2 may be set as the attitude index Z (with the calculation of the first index X1 omitted).

(4) Although the first index X1 and the second index X2 are increased as the capturing direction of the capturing device 10 is closer to that of the reference state in the exemplified case of each of the above-described aspects, the relationship between the suitableness of the capturing direction and the magnitudes of the first index X1 and the second index X2 can be reversed. For example, if an inverse number of the sum or the weighted sum of the N ratios R(1) to R(N) is calculated as the first index X1, the first index X1 has a smaller value as the capturing direction of the capturing device 10 is closer to that of the reference state. Also with respect to the second index X2, for example, if an absolute value |Cx| of an x-axis component Cx of a vector C is calculated as the second index X2, the second index X2 has a smaller value as the capturing direction of the capturing device 10 is closer to that of the reference state.

(5) Although the outline of the range 74 where the musical symbols 72(n) are searched for is used as the reference pattern 80 in each of the above-described aspects, the shape and the position of the reference pattern 80 are not limited to those exemplarily described above. For example, a straight line in parallel to the y-axis can be used as the reference pattern 80. As understood from this exemplified description, the reference pattern 80 is comprehensively expressed as a pattern to be used as a reference of the symbol column pattern 78 (symbol column).

(6) Although the rectangular symbol column pattern 78 that embraces the respective apexes of the N symbol regions 76(1) to 76(N) and has the minimum area is set in each of the above-described aspects, the shape of and the method for setting the symbol column pattern 78 are not limited to those exemplarily described above. For example, a straight line passing through the centers of gravity of the symbol regions 76(1) and 76(N) or a rectangle extending along the straight line can be used as the symbol column pattern 78.

(7) Although a treble clef and a bass clef are detected as the musical symbols 72(n) in each of the above-described aspects, the types of the musical symbols 72(n) are not limited to those exemplarily described above. For example, one of a treble clef and a bass clef, or a C clef can be detected as the musical symbol 72(n). Besides, although the staff 62(n) including the five-line staff consisting of five lines respectively corresponding to different pitches is exemplarily described as a musical score in each of the above-described aspects, the type of musical score (the notation method) is not limited to that exemplarily described above. For example, a tablature in which a playing method (specifically, fingering) is shown in a staff 62(n) consisting of six lines respectively corresponding to strings of a stringed instrument can be used as a musical score for applying the present invention. If an image of a tablature is to be shot, a character string of "TAB" vertically shown at the left end of each staff 62(n) can be detected as the musical symbol 72(n).

(8) Although each of the plural musical score images 70 generated in a time-series manner through a video-image capturing operation is a target to be processed in each of the above-described aspects, for example, one musical score image 70 generated through a still image capturing operation can be used as a target for calculating the first index X1 and the second index X2. As understood from the description made so far, it is not indispensable to shoot a video image of a musical score in the present invention.

(9) The musical score image analyzer 100 can be also realized by a combination of a server device and a terminal unit (such as a cellular phone or a smartphone) communicating with each other via communications network such as cellular network or Internet. For example, the index calculating module 530 can be provided in the server device with the other elements (such as the symbol detecting module 510, the symbol column specifying module 520, the display controlling module 560 and the capturing controlling module 570) provided in the terminal unit. As understood from the description made so far, the musical score image analyzer 100 can be realized in the form of an assembly (a system) of a plurality of devices separately configured, and division of the processing to be executed by each device is arbitrary.

(10) The musical score image analyzer 100 can be also realized by a server device communicating with a terminal unit (such as a cellular phone or a smartphone) via communications network such as cellular network or Internet. Specifically, the musical score image analyzer 100 receives a musical score image 70 having been generated by the capturing device 10 contained in the terminal unit, and transmits the first index X1 and the second index X2 having been calculated through the analysis of the musical score image 70 to the terminal unit to be provided to a user. As understood from the description made so far, the capturing device 10 is not an indispensable element of the musical score image analyzer 100.

(11) Although the capturing device 10 is instructed to perform a still image capturing operation when the attitude index Z is larger than the threshold value ZT in the second embodiment, the condition on the attitude index Z for instructing the still image capturing operation is not limited to that exemplarily described above. Specifically, the capturing device 10 can be instructed to perform the still image capturing operation on condition that the attitude index Z is stably retained in a range beyond the threshold value ZT for a prescribed time period. For example, if spread (for example, dispersion) of a plurality of attitude indexes Z calculated in a time-series manner is below a prescribed value, it can be determined that the attitude index Z is in a stable state. Besides, with the change over time of the attitude index Z monitored, the capturing device 10 can be instructed to perform the still image operation when the attitude index Z is detected to have a maximum value. As understood from the description made so far, the capturing controlling module 570 is comprehensively expressed as an element for instructing the capturing device 10 to perform a still image capturing operation for a musical score image 70A when the attitude index Z satisfies a prescribed condition, and specific contents of the condition for issuing the instruction can be disregarded.

(12) The musical score image analyzer 100 exemplarily described in each of the above-described aspects is realized by a combination of the control unit 50 and a program as exemplarily described in each aspect. A program according to a preferred aspect of the present invention causes a computer to function as the symbol detecting module 510 that detects the musical symbols 72(1) to 72(N) in the musical score image 70 of a musical score including N staffs 62(1) to 62(N) arranged in parallel to each other and the musical symbols 72($n$) each disposed in a prescribed position in the corresponding staff 62($n$); the symbol column specifying module 520 that specifies the symbol column, that is, a column of the N musical symbols 72(1) to 72(N) having been detected by the symbol detecting module 510; the unit region setting module 532 that sets the unit region A(n) crossing the symbol column in a position corresponding to the musical symbol 72($n$); and the first index calculating module 534 that calculates the first index X1 in accordance with the ratio R(n) at which the staff 62($n$), where the corresponding musical symbol 72($n$) is disposed, is included in the corresponding unit region A(n). The exemplary program can be stored in a computer-readable recording medium and provided in this form to be installed in the computer. The recording medium is, for example, a non-transitory recording medium, a preferable example includes an optical recording medium (an optical disk) such as a CD-ROM, and may include recording media of known arbitrary types such as a semiconductor recording medium and a magnetic recording medium. Alternatively, the program can be delivered to the computer by delivery through communications network.

(13) The present invention is specified also as a method for operating the musical score image analyzer 100 of each of the above-described aspects (namely, a musical score image analyzing method). For example, a musical score image analyzing method according to one aspect of the present invention includes: detecting musical symbols 72(1) to 72(N) in the musical score image 70 of a musical score including N staffs 62(1) to 62(N) arranged in parallel to each other and the musical symbols 72($n$) each disposed in a prescribed position in the corresponding staff 62($n$) (S2); specifying the symbol column, that is, a column of the detected N musical symbols 72(1) to 72(N) (S3); setting the unit region A(n) crossing the symbol column in a position corresponding to the musical symbol 72($n$) (S4); and calculating the first index X1 in accordance with the ratio R(n) at which the staff 62($n$), where the corresponding musical symbol 72($n$) is disposed, is included in the corresponding unit region A(n) (S5).

The present invention provides a musical score image analyzer including: a symbol detecting module that detects musical symbols in a musical score image obtained by capturing a musical score including a plurality of staffs arranged in parallel to each other and the musical symbols respectively disposed in prescribed positions in the staffs; a symbol column specifying module that specifies a symbol column, that is, a column of the plural musical symbols having been detected by the symbol detecting module; an index calculating module that calculates an index relating image capturing in accordance with the symbol column; and a capturing controlling module that instructs a capturing device to perform a still image capturing operation for the musical score image if the index satisfies a prescribed condition. Besides, the present invention also provides a musical score image analyzing method including: detecting musical symbols in a musical score image obtained by capturing a musical score including a plurality of staffs arranged in parallel to each other and the musical symbols respectively disposed in prescribed positions in the staffs; specifying a symbol column, that is, a column of the plural musical symbols having been detected by the symbol detecting module; calculating an index relating image capturing in accordance with the symbol column; and instructing a capturing device to perform a still image capturing operation for the musical score image if the index satisfies a prescribed condition.

The musical score image analyzer according to one aspect of the present invention includes: a symbol detecting module that detects musical symbols in a musical score image obtained by capturing a musical score including a plurality of staffs arranged in parallel to each other and the musical symbols respectively disposed in prescribed positions in the staffs; a symbol column specifying module that specifies a symbol column, that is, a column of the plural musical symbols having been detected by the symbol detecting module; a unit region setting module that sets unit regions crossing the symbol column in positions respectively corresponding to the musical symbols; and a first index calculating module that calculates a first index in accordance with a ratio at which each of the staffs, where the musical symbols are disposed, is included in a corresponding one of the unit regions. In this configuration, the unit regions crossing the symbol column, that is, the column of a plurality of musical symbols detected in the musical score image, are set, so that the first index can be calculated in accordance with a ratio of each staff included in a corresponding one of the unit regions. In other words, as the capturing direction is more inclined against the normal direction of the musical score, the ratio of the staff included in the unit region is reduced. Therefore, it can be quantitatively evaluated whether or not the capturing direction for the musical score is suitable.

In a preferred aspect of the present invention, the unit region setting modules sets, with respect to each of the plural musical symbols, the unit region crossing the symbol column in the position corresponding to the musical symbol, and the first index calculating module calculates, with respect to each of the plural unit regions, a ratio at which the staff, where the musical symbol corresponding to the unit region is disposed, is included in the unit region, and calculates the first index in accordance with the ratios in the plural unit regions. In this configuration, the ratio of the staff included in the corresponding unit region is calculated with respect to each of the plural unit regions, and the first index is calculated in accordance with the ratios in the plural unit regions. Therefore, as compared with a case where a ratio of a staff in merely one unit region is considered, it can be quantitatively evaluated, over a wide range of the musical score image, whether or not the capturing direction for the musical score is suitable.

In a preferred aspect of the present invention, the symbol detecting module detects the musical symbols in a prescribed range set in the musical score image. In this configuration, the musical symbols are searched for in the prescribed range of the musical score image, and the musical symbols are not searched for outside the prescribed range. Therefore, as compared with a configuration where the musical symbols are searched for in the whole range of the musical score image, processing load of the symbol detecting module can be reduced, and hence, processing load of the entire musical score image analyzer can be reduced.

In a preferred aspect of the present invention, the first index calculating module classifies a plurality of straight lines detected in the plural staffs into sets in the same number as that of the musical symbols having been detected by the symbol detecting module, and calculates the first index in accordance with a ratio at which each of the classified straight lines is included in a corresponding one of the unit regions. In this configuration, the plural straight lines detected in the plural staffs are classified into a plurality of sets, and the first index is calculated in accordance with the ratio at which each of the classified straight lines is included in the corresponding one of the unit regions. Therefore, as compared with a case where the plural straight lines are not classified with respect to the musical symbols (namely, with respect to the staffs), even if a unit region extends over a plurality of staffs, the ratio of the staff included in the unit region can be highly precisely specified with respect to each of the staffs, so as to appropriately calculate the first index. Besides, since the plural straight lines detected in the plural staffs are classified into the sets in the same number as that of the musical symbols, as compared with a configuration where the number of classes for classifying the plural straight lines is unknown, the plural straight lines can be advantageously appropriately classified for calculating the first index.

In a preferred aspect of the present invention, the first index calculating module calculates the first index in accordance with a ratio of points included in a corresponding one of the unit regions out of all points on each of the plural straight lines detected in the staffs. In this configuration, the first index is calculated in accordance with the ratio of the points included in the unit region out of all the points on the plural straight lines detected in the staffs. Therefore, as compared with a case where, for example, a ratio of each straight line positioned within the unit region is calculated to calculate the first index, the first index can be advantageously easily calculated.

In a preferred aspect of the present invention, a second index calculating module that calculates a second index is included. In this configuration, the second index in accordance with an angle of the symbol column is calculated. Specifically, the angle of the symbol column changes in accordance with the inclination angle of the capturing direction against the normal direction of the musical score or the rotation angle of the capturing range against the musical score (the rotation angle of the capturing device 10 in a plane parallel to the musical score). Accordingly, it can be quantitatively evaluated whether or not the capturing direction for the musical score is suitable.

In a preferred aspect of the present invention, detection of the musical symbols by the symbol detecting module and specification of the symbol column by the symbol column specifying module are successively executed simultaneously with a capturing operation for the musical score by the capturing device, and the musical score image analyzer includes a display controlling module that causes a display to display a symbol column pattern corresponding to the symbol column and a reference pattern to be used as a reference of the symbol column pattern to be superimposed on the musical score image simultaneously with the capturing operation for the musical score by the capturing device, and that changes the symbol column pattern over time in accordance with a result of specifying the symbol column by the symbol column specifying module. In this configuration, the symbol column pattern changing over time and the reference pattern used as the reference of the symbol column pattern are displayed to be superimposed on the musical score image simultaneously with the capturing operation for the musical score. Accordingly, a user can adjust the capturing direction to a suitable direction while visually checking the relationship among the symbol column pattern, the reference pattern and the musical score image.

The musical score image analyzer according to a preferred aspect of the present invention includes: a symbol detecting module that detects musical symbols in a musical score image obtained by capturing a musical score including a plurality of staffs arranged in parallel to each other and the musical symbols respectively disposed in prescribed positions in the staffs; a symbol column specifying module that specifies a symbol column, that is, a column of the plural musical symbols having been detected by the symbol detecting module; and a second index calculating module that calculates a second index in accordance with an angle of the symbol column having been specified by the symbol specifying module. In this configuration, the second index in accordance with the angle of the symbol column, that is, the column of the plural musical symbols having been detected in the musical score image, is calculated. Specifically, the angle of the symbol column changes in accordance with the inclination angle of the capturing direction against the normal direction of the musical score or the rotation angle of the capturing range against the musical score (the rotation angle of the capturing device in a plane parallel to the musical score). Accordingly, it can be quantitatively evaluated whether or not the capturing direction for the musical score is suitable.

The musical score image analyzer according to a preferred aspect of the present invention includes: a symbol detecting module that detects musical symbols in each of musical score images generated, in a time-series manner, through a video-image capturing operation for capturing, by a capturing device, a musical score including a plurality of staffs arranged in parallel to each other and the musical symbols respectively disposed in prescribed positions in the staffs; a symbol column specifying module that specifies a symbol column, that is, a column of the plural musical symbols having been detected by the symbol detecting module; an index calculating module that calculates, in accordance with the symbol column, an attitude index corresponding to an index for indicating whether or not a capturing direction for the musical score is suitable; and a capturing controlling module that instructs the capturing device to perform a still image capturing operation for the musical score image if the attitude index satisfies a prescribed condition. In this configuration, if the attitude index corresponding to the index for indicating whether or not the capturing direction for the musical score is suitable satisfies the prescribed condition, the capturing controlling module instructs the capturing device to perform a still image capturing operation. Therefore, a musical score image shot in a suitable capturing direction can be obtained without a user instructing to shoot the image.

In a preferred aspect of the present invention, the index calculating module includes: a unit region setting module that sets unit regions crossing the symbol column in positions respectively corresponding to the musical symbols;

and a first index calculating module that calculates a first index in accordance with a ratio at which each of the staffs, where the musical symbols are disposed, is included in a corresponding one of the unit regions, and the index calculating module sets the attitude index in accordance with the first index. In this configuration, the unit regions crossing the symbol column, that is, the column of the plural musical symbols, are set, the first index is calculated in accordance with the ratios of the staffs included in the corresponding unit regions, and the attitude index is affected by the first index. Therefore, the attitude index for quantitatively evaluating whether or not the capturing direction for the musical score is suitable can be applied for instructing a still image capturing operation.

In a preferred aspect of the present invention, the index calculating module includes a second index calculating module that calculates a second index in accordance with an angle of the symbol column, and sets the attitude index in accordance with the second index. In this configuration, the second index in accordance with the angle of the symbol column is calculated, and the attitude index is affected by the second index. Therefore, the attitude index for quantitatively evaluating whether or not the capturing direction for the musical score is suitable can be applied for instructing a still image capturing operation.

In a preferred aspect of the present invention, the attitude index is an index that has a larger value as a lateral direction of a capturing range is closer to parallel to a lateral direction of the musical score, and the prescribed condition is that the attitude index is larger than a prescribed threshold value. In this configuration, the attitude index has a larger value as the lateral direction of the capturing range is closer to parallel to the lateral direction of the musical score, and the capturing controlling module instructs the capturing device to perform a still image capturing operation when the attitude index is larger than the prescribed threshold value. Therefore, a musical score image shot in a suitable capturing direction in which the lateral direction of the capturing range is close to parallel to the lateral direction of the musical score can be obtained.

According to the present invention, a musical score image shot in a suitable capturing direction can be obtained.

What is claimed is:

1. A musical score image analyzer comprising:
a memory string instructions; and
a processor configured to implement the instructions to execute a plurality of tasks, including:
   a detecting task that detects musical symbols in a musical score image obtained by capturing a musical score having a plurality of staffs arranged in parallel to each other and the musical symbols respectively disposed in prescribed positions in the staffs;
   a specifying task that specifies a symbol column having the detected musical symbols that are arranged in a column;
   a first calculating task that calculates an index relating an image capturing based on the symbol column;
   an instructing task that instructs a capturing device to capture a still image for the musical score image when the index satisfies a prescribed condition;
   a setting task that sets unit regions crossing the symbol column in positions respectively corresponding to the musical symbols; and
   a second calculating task that calculates a first index, to be used for calculating the index, in accordance with a ratio at which each of the staffs, where the musical symbols are disposed, is included in a corresponding one of the unit regions.

2. The musical score image analyzer according to claim 1, wherein:
the setting task sets, with respect to each of the musical symbols, a unit region, among the unit regions crossing the symbol column, in the position corresponding to a musical symbol, among the musical symbols, and
the second calculating task further calculates, with respect to each of the unit regions, a ratio at which the staff, where the musical symbol corresponding to the respective unit region is disposed, is included in the respective unit region, and calculating the first index in accordance with the ratios in the unit regions.

3. The musical score image analyzer according to claim 1, wherein the detecting task detects the musical symbols in a prescribed range set in the musical score image.

4. The musical score image analyzer according to claim 1, wherein:
the plurality of tasks include a classifying task that classifies a plurality of straight lines detected in the staffs into sets in the same number as that of the detected musical symbols, and
the second calculating task further calculates the first index in accordance with a ratio at which each of the classified straight lines is included in a corresponding one of the unit regions.

5. The musical score image analyzer according to claim 1, wherein the the second calculating task further calculates the first index in accordance with a ratio of points included in a corresponding one of the unit regions out of all points on each of a plurality of straight lines detected in the staffs.

6. The musical score image analyzer according to claim 1, wherein the plurality of tasks include a third calculating task that calculates a second index, to be used for calculating the index, in accordance with an angle of the symbol column.

7. The musical score image analyzer according to claim 1, wherein:
the detection task successively detects the musical symbols and specification of the symbol column simultaneously with a capturing operation for the musical score by the capturing device; and
the plurality of tasks include:
   a displaying task that causes a display to display a symbol column pattern corresponding to the symbol column and a reference pattern to be used as a reference of the symbol column pattern to be superimposed on the musical score image simultaneously with the capturing operation for the musical score by the capturing device; and
   a changing task that changes the symbol column pattern over time in accordance with a result of specifying the symbol column.

8. A musical score image analyzer comprising:
a memory string instructions; and
a processor configured to implement the instructions to execute a plurality of tasks, including:
   a first detecting task that detects musical symbols in a musical score image obtained by capturing a musical score having a plurality of staffs arranged in parallel to each other and the musical symbols respectively disposed in prescribed positions in the staffs;
   a specifying task that specifies a symbol column having the detected musical symbols that are arranged in a column;

a first calculating task that calculates an attitude index indicating whether or not a capturing direction for the musical score is suitable based on the symbol column;

an instructing task that instructs a capturing device to capture a still image for the musical score image when the attitude index satisfies a prescribed condition; and a second detecting task that detects the musical symbol in each of musical score images generated in a time-series manner through a video-image capturing operation for capturing the musical score by the capturing device.

9. The musical score image analyzer according to claim 8, wherein the plurality of tasks include:

a first setting task that sets unit regions crossing the symbol column in positions respectively corresponding to the musical symbols;

a second calculating task that calculates a first index in accordance with a ratio at which each of the staffs, where the musical symbols are disposed, is included in a corresponding one of the unit regions; and a second setting task that sets the attitude index in accordance with the first index.

10. The musical score image analyzer according to claim 8, wherein the plurality of tasks include:

a second calculating task that calculates a second first index in accordance with an angle of the symbol column; and a setting task that sets the attitude index in accordance with the second first index.

11. The musical score image analyzer according to claim 8, wherein:

the attitude index has a larger value as a lateral direction of a capturing range is closer to parallel to a lateral direction of the musical score, and the prescribed condition is that the attitude index is larger than a prescribed threshold value.

12. A musical score image analyzing method comprising the steps of:

detecting musical symbols in a musical score image obtained by capturing a musical score having a plurality of staffs arranged in parallel to each other and the musical symbols respectively disposed in prescribed positions in the staffs;

specifying a symbol column having the detected musical symbols that are arranged in a column;

calculating an index relating an image capturing based on the symbol column;

instructing a capturing device to perform capturing operation of a still image for the musical score image when the index satisfies a prescribed condition;

setting unit regions crossing the symbol column in positions respectively corresponding to the musical symbols; and calculating a first index, to be used for calculating the index, in accordance with a ratio at which each of the staffs, where the musical symbols are disposed, is included in a corresponding one of the unit regions.

13. The musical score image analyzing method according to claim 12, wherein:

the setting step sets, with respect to each of the plural musical symbols, a unit region, among the unit regions crossing the symbol column, in the position corresponding to a musical symbol, among the musical symbols, and the first index calculating step further calculates, with respect to each of the unit regions, a ratio at which the staff, where the musical symbol corresponding to the respective unit region is disposed, is included in the respective unit region, and calculates the first index in accordance with the ratios in the unit regions.

14. The musical score image analyzing method according to claim 12, wherein the detecting step detects the musical symbols in a prescribed range set in the musical score image.

15. The musical score image analyzing method according to claim 12, further comprising the step of:

classifying a plurality of straight lines detected in the staffs into sets in the same number as that of the detected musical symbols, wherein the first index calculating step further calculates the first index in accordance with a ratio at which each of the classified straight lines is included in a corresponding one of the unit regions.

16. The musical score image analyzing method according to claim 12, the first index calculating step further calculates the first index in accordance with a ratio of points included in a corresponding one of the unit regions out of all points on each of a plurality of straight lines detected in the staffs.

17. The musical score image analyzing method according to claim 12, further comprising the step of calculating a second index, to be used for calculating the index, in accordance with an angle of the symbol column.

18. The musical score image analyzing method according to claim 12, wherein:

the detection step successfully detects the musical symbols and specification of the symbol column simultaneously with a capturing operation for the musical score by the capturing device; and the method further comprises the steps of:

causing a display to display a symbol column pattern corresponding to the symbol column and a reference pattern to be used as a reference of the symbol column pattern to be superimposed on the musical score image simultaneously with the capturing operation for the musical score by the capturing device; and changing the symbol column pattern over time in accordance with a result of specifying the symbol column.

19. A musical score image analyzing method comprising the steps of:

detecting musical symbols in a musical score image obtained by capturing a musical score having a plurality of staffs arranged in parallel to each other and the musical symbols respectively disposed in prescribed positions in the staffs;

specifying a symbol column having the detected musical symbols which are arranged in a column;

calculating an attitude index indicating whether or not a capturing direction for the musical score is suitable based on the symbol column;

instructing a capturing device to capture a still image for the musical score image when the first index satisfies a prescribed condition; and detecting the musical symbol in each of musical score images generated in a time-series manner through a video-image capturing operation for capturing the musical score by the capturing device.

20. The musical score image analyzing method according to claim 19, further comprising the steps of:

setting unit regions crossing the symbol column in positions respectively corresponding to the musical symbols;

calculating a first index in accordance with a ratio at which each of the staffs, where the musical symbols are disposed, is included in a corresponding one of the unit regions; and setting the attitude index in accordance with the first index.

21. The musical score image analyzing method according to claim 19, further comprising the steps of:

calculating a first index in accordance with an angle of the symbol column; and setting the attitude index in accordance with the first index.

22. The musical score image analyzing method according to claim 19, wherein:

the attitude index has a larger value as a lateral direction of a capturing range is closer to parallel to a lateral direction of the musical score, and the prescribed condition is that the attitude index is larger than a prescribed threshold value.

* * * * *